(12) United States Patent
Chou

(10) Patent No.: US 7,821,722 B2
(45) Date of Patent: Oct. 26, 2010

(54) WIDE-ANGLE PROJECTION LENS AND PROJECTION APPARATUS USING THE SAME

(75) Inventor: Hsiang-Ho Chou, Tucheng (TW)

(73) Assignee: Qisda Corporation, Taoyuan (TW)

( * ) Notice: Subject to any disclaimer, the term of this patent is extended or adjusted under 35 U.S.C. 154(b) by 8 days.

(21) Appl. No.: 12/285,341

(22) Filed: Oct. 2, 2008

(65) Prior Publication Data
US 2009/0091846 A1 Apr. 9, 2009

(30) Foreign Application Priority Data
Oct. 3, 2007 (TW) .............................. 96137158 A

(51) Int. Cl.
*G02B 15/14* (2006.01)
(52) U.S. Cl. ...................... 359/680; 359/681
(58) Field of Classification Search ................. 359/680, 359/681, 769, 774, 781
See application file for complete search history.

(56) References Cited

U.S. PATENT DOCUMENTS

| 6,285,509 | B1 * | 9/2001 | Nakayama et al. ........... 359/676 |
| 7,173,777 | B1 | 2/2007 | Lu et al. |
| 7,227,682 | B2 * | 6/2007 | Caldwell et al. ............. 359/432 |
| 2001/0012160 | A1 * | 8/2001 | Takatsuki .................... 359/680 |

* cited by examiner

*Primary Examiner*—Timothy J Thompson
(74) *Attorney, Agent, or Firm*—Bacon & Thomas, PLLC

(57) ABSTRACT

A wide-angle projection lens and a projection apparatus using the same are provided. The wide-angle projection lens, from an image side of the projection apparatus, includes a first lens group, a second lens group and a third lens group. An aperture stop of the wide-angle projection lens is disposed in the third lens group. The first lens group has a negative effective refractive power and at least one aspheric lens surface. The second lens group has a first positive effective refractive power. The third lens group has a second positive effective refractive power. The effective focal length of the wide-angle projection lens is between 6.5 mm and 9.5 mm.

23 Claims, 18 Drawing Sheets

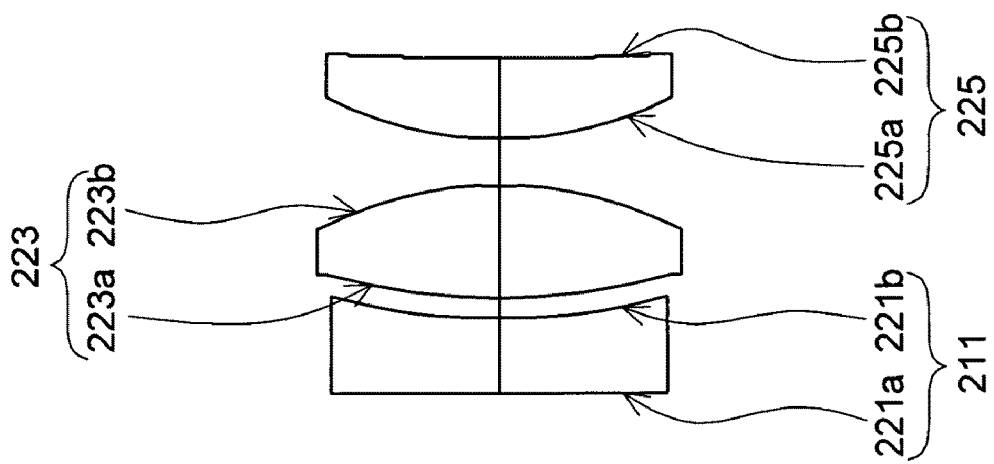

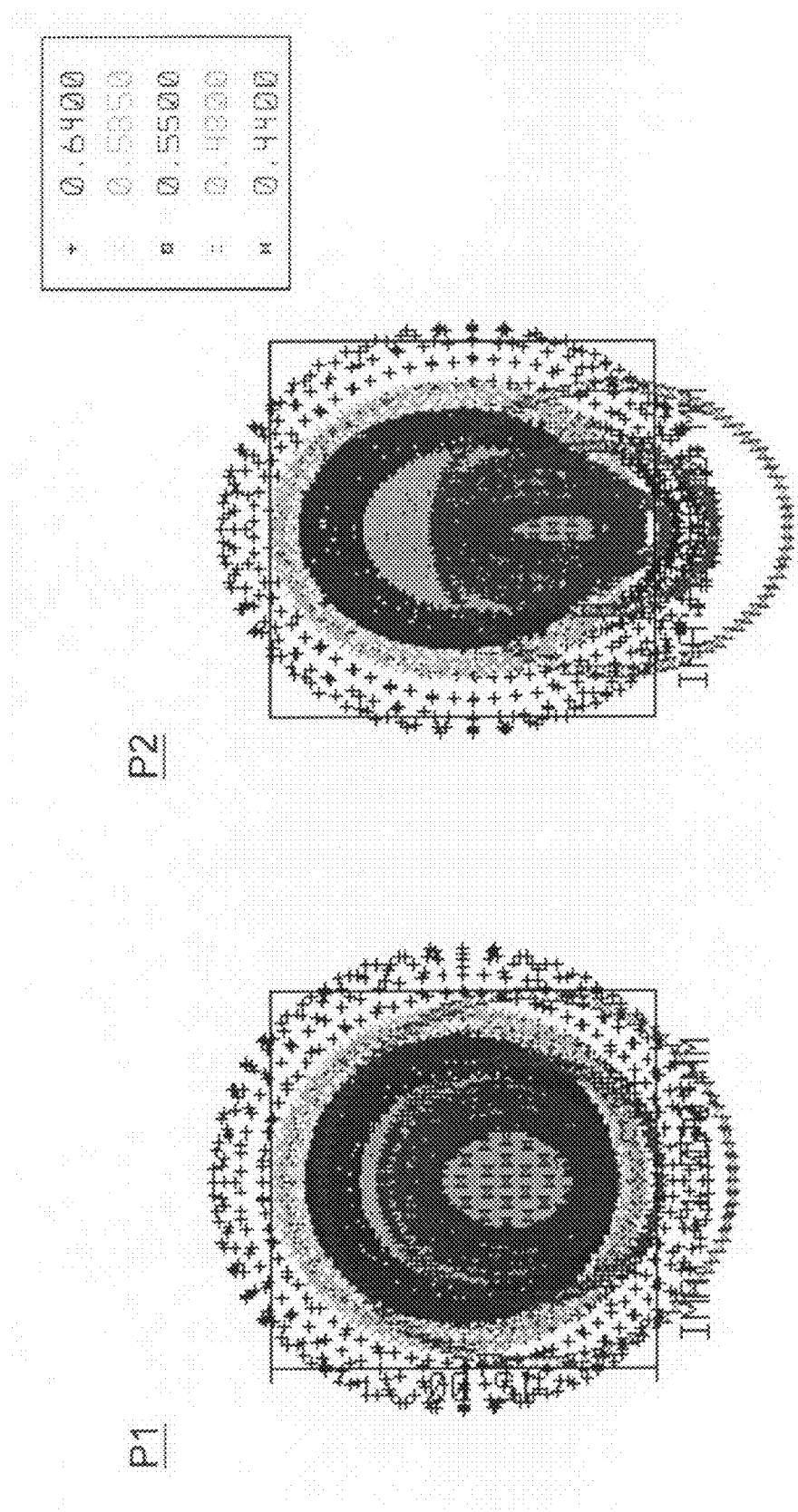

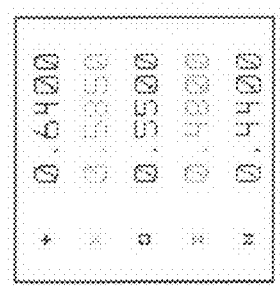
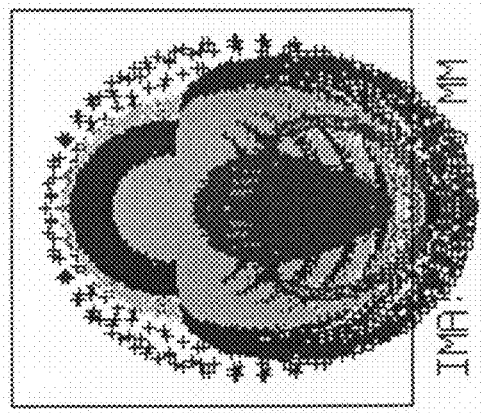
EXHIBIT 1D
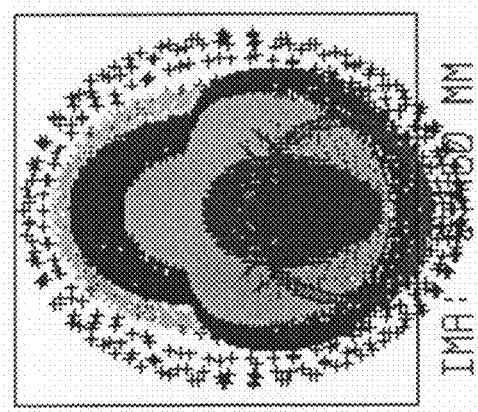
EXHIBIT 1C

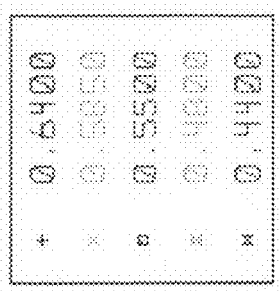
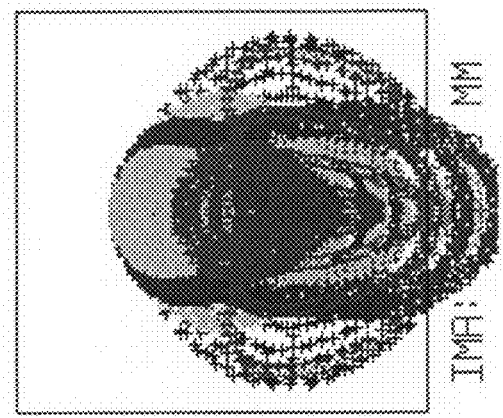
EXHIBIT 1F
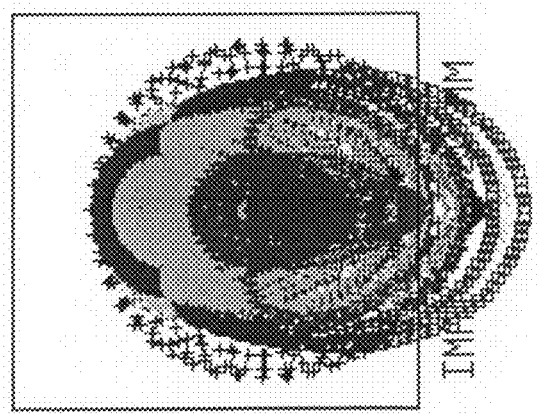
EXHIBIT 1E

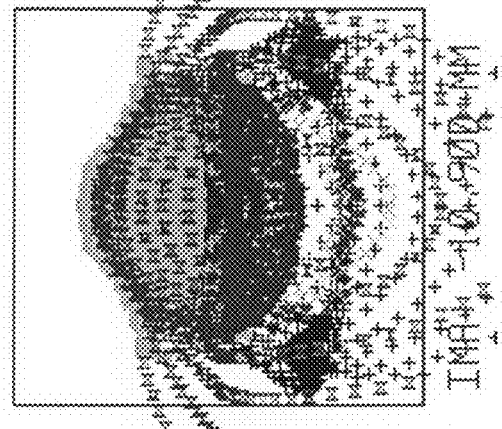
EXHIBIT 1H
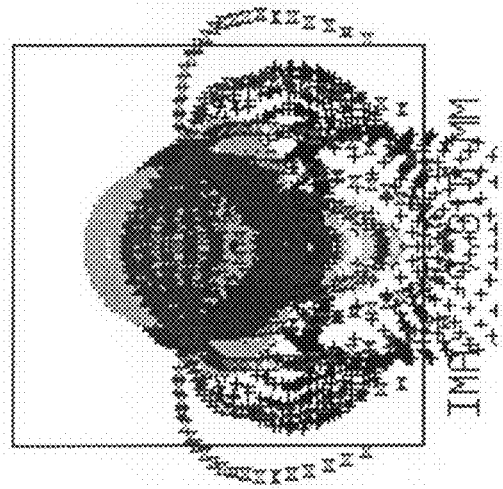
EXHIBIT 1G

WIDE-ANGLE PROJECTION LENS AND PROJECTION APPARATUS USING THE SAME

This application claims the benefit of Taiwan application Serial No. 96137158, filed Oct. 3, 2007, the subject matter of which is incorporated herein by reference.

BACKGROUND OF THE INVENTION

1. Field of the Invention

The invention relates in general to a wide-angle projection lens and a projection apparatus using the same, and more particularly to a wide-angle projection lens having three lens groups and a projection apparatus using the same.

2. Description of the Related Art

The design of a projection apparatus must satisfy many restrictions regarding the space. For example, a bigger projection space such as a big conference room or auditorium must go with a larger projection image, but for a smaller projection space such as a family lounge, there is no need to project an image with a large scale of amplification. As the size and resolution of the projection image from a projection apparatus is related to the effective focal length of the projection lens, how to project an image with a large scale of amplification and meanwhile maintain most of the image information is a big challenge to the manufacturers.

SUMMARY OF THE INVENTION

The invention is directed to a wide-angle projection lens and a projection apparatus using the same. The projection lens has three lens groups, wherein a lens group has a negative effective refractive power and at least one aspheric lens, and the other two lens groups have a positive effective refractive power, such that even if the image from the projection lens is enlarged, most of the image information is still maintained.

According to a first aspect of the present invention, a wide-angle projection lens used in a projection apparatus is provided. The wide-angle projection lens, from an image side of the projection apparatus, includes a first lens group, a second lens group and a third lens group. An aperture stop of the wide-angle projection lens is disposed in the third lens group. The first lens group has a negative effective refractive power and at least one aspheric lens surface. The second lens group has a first positive effective refractive power. The third lens group has a second positive effective refractive power. The effective focal length of the wide-angle projection lens is between 6.5 mm and 9.5 mm.

According to a second aspect of the present invention, a projection apparatus including an optical element and a wide-angle projection lens is provided. The wide-angle projection lens includes a first lens group, a second lens group and a third lens group. The first lens group has a negative effective refractive power and at least one aspheric lens surface. The second lens group is disposed between the optical element and the first lens group and has a first positive effective refractive power. The third lens group is disposed between the optical element and the second lens group and has a second positive effective refractive power. An aperture stop of the wide-angle projection lens is disposed in the third lens group. The effective focal length of the wide-angle projection lens is between 6.5 mm and 9.5 mm.

The invention will become apparent from the following detailed description of the preferred but non-limiting embodiments. The following description is made with reference to the accompanying drawings.

BRIEF DESCRIPTION OF THE DRAWINGS

FIG. 1C shows the second lens group in FIG. 1A;

Figure 1A:
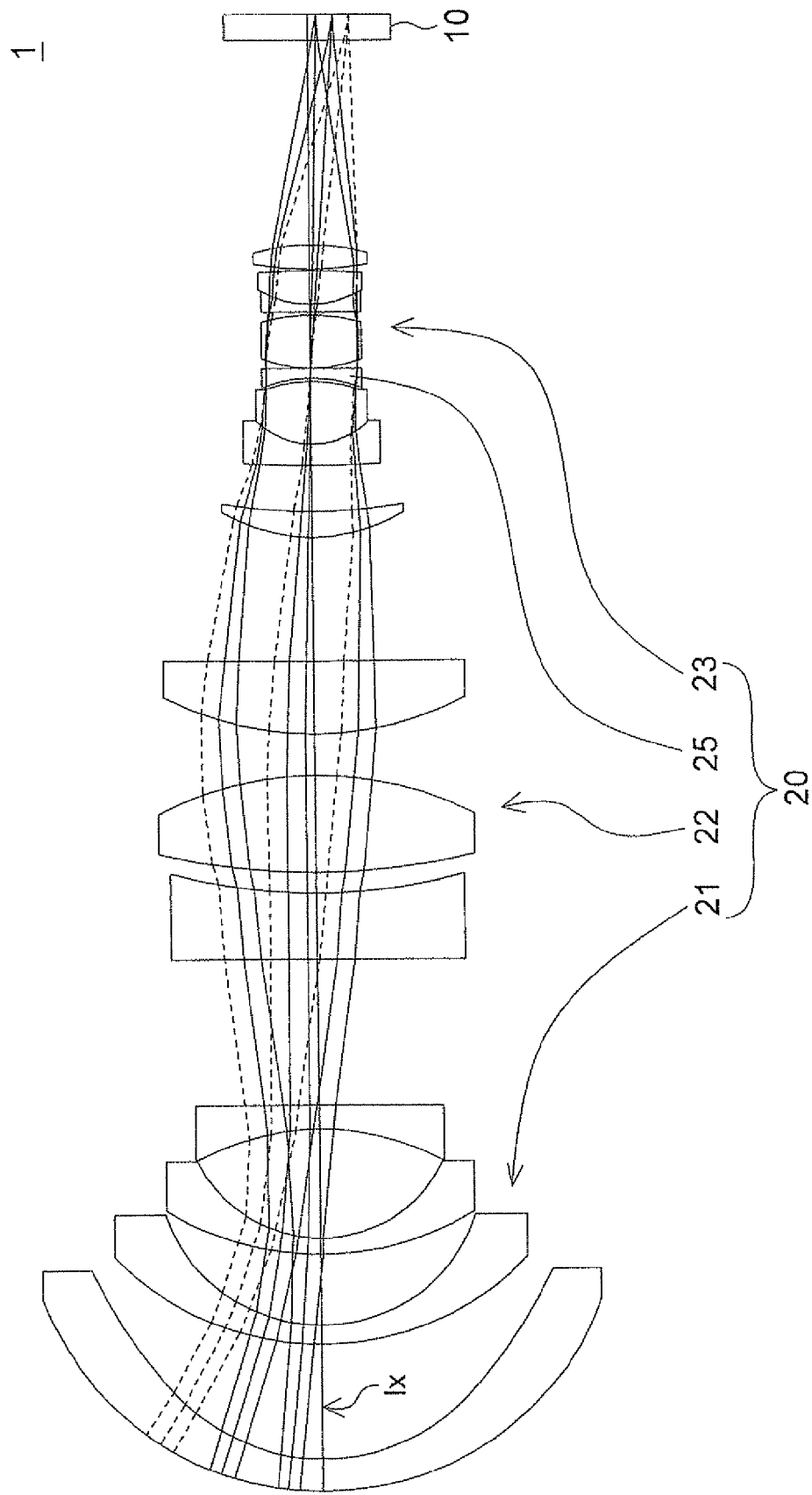
FIG. 1A shows a projection apparatus according to a preferred embodiment of the invention.

Exhibits 1A to 1H are diagrams of the image point shift resulted from the test performed by the wide-angle projection lens according to Table 2.

DETAILED DESCRIPTION OF THE INVENTION

FIGS. 1A to 1D show a projection apparatus and its three lens groups, respectively, according to a preferred embodiment of the invention. The projection apparatus 1 includes an optical element 10 and a wide-angle projection lens 20. The wide-angle projection lens 20 includes a first lens group 21, a second lens group 22 and a third lens group 23. The first lens group 21 has an imaging optical axis Ix and a negative effective refractive power and has at least one aspheric lens surface. The second lens group 22 is disposed between the optical element 10 and the first lens group 21 and has a first positive effective refractive power. The third lens group 23 is disposed between the optical element 10 and the second lens group 22 and has a second positive effective refractive power. An aperture stop 25 of the wide-angle projection lens 20 is disposed in the third lens group 23. The optical element 10 is a digital micro-mirror device for example. The digital micro-mirror device has many rotatable micro lenses. After receiving a signal, the digital micro-mirror device drives the micro lenses to rotate so as to reflect the light from different positions, thereby displaying each pixel point of an image.

Figure 1B:
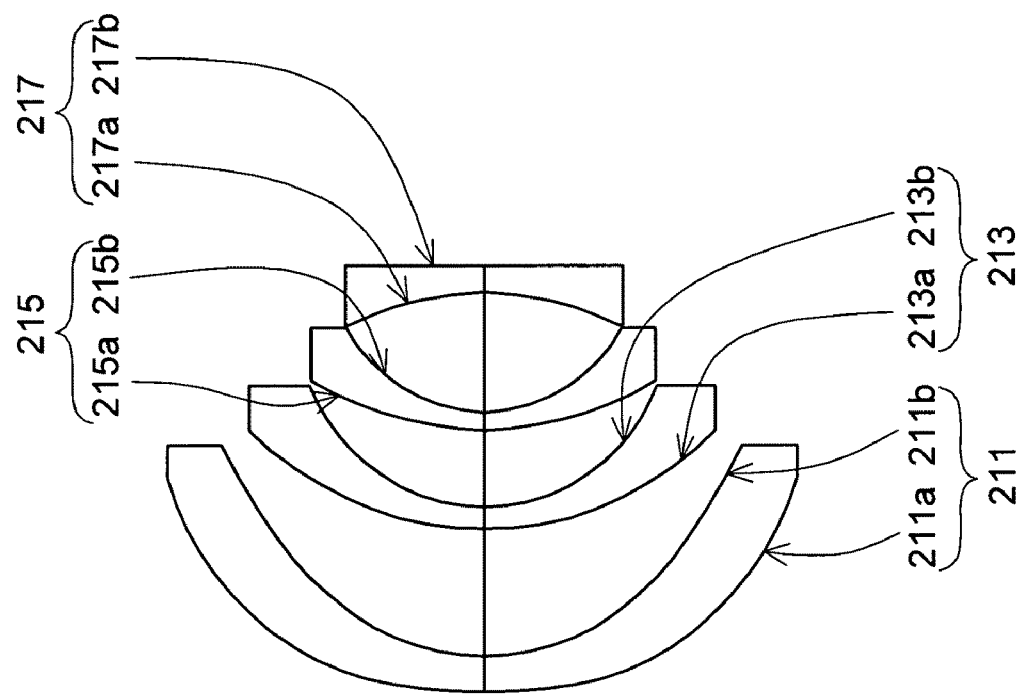
FIG. 1B shows the first lens group in FIG. 1A.

The view-angle of the wide-angle projection lens 20 is between 100° and 120°. In addition, by combining the first lens group 21, the second lens group 22 and the third lens group 23 together, the relationship between an effective focal length fw of the wide-angle projection lens 20 and a height h of an image on an image side (located on the left side of the wide-angle projection lens 20 in FIG. 1A but is not illustrated) is expressed as $1.2 < |h/fw| < 1.6$ The first lens group 21 comprises at least one aspheric lens including at least two aspheric lens surfaces. As shown in FIG. 1B, the first lens group 21 includes three convexo-concave lenses 211, 213 and 215 and a plano-concave lens 217. The convexo-concave lens 211 has a convex surface 211a and a concave surface 211b, wherein the convex surface 211a is disposed backwards from the optical element 10 (shown in FIG. 1A). The convexo-concave lens 213 has a convex surface 213a and a concave surface 213b, wherein the convex surface 213a faces the concave surface 211b. The convexo-concave lens 215 has a convex surface 215a and a concave surface 215b, wherein the convex surface 215a faces the concave surface 213b. The plano-concave lens 217 has a concave surface 217a and a planar surface 217b, wherein the concave surface 217a faces the concave surface 215b.

The surface polynomial of an aspheric lens surface is expressed as:

$$\frac{X^2}{R + \sqrt{R^2 - (1+K)X^2}} + AX^4 + BX^6 + CX^8 + DX^{10} + \ldots$$

wherein X denotes a horizontal distance to a rotating symmetric axis, R denotes an apex curvature radius, K denotes a constant of a conic curve, A denotes a correction coefficient corresponding to the $X^4$ term, and B, C and D respectively denote correction coefficient corresponding to the $X^6$ term, the $X^8$ term and the $X^{10}$ term. As the polynomial expression is normally up to the $X^{10}$ term, the present embodiment of the invention only uses correction coefficients K and A to D. In the first lens group 21, one aspheric lens would do. In the present embodiment of the invention, the convexo-concave lens 211 is an aspheric lens that has a first and a second aspheric lens surfaces. The coefficients for the first aspheric lens surface and the second aspheric lens surface are illustrated in Table 1.

TABLE 1

|   | first aspheric lens surface | second aspheric lens surface |
|---|---|---|
| K | 2.129996 | −0.2726078 |
| A | 5.4968331e−006 | 4.3270304e−006 |
| B | −2.5176141e−009 | 2.3293403e−010 |
| C | 8.2007016e−013 | −6.9193386e−013 |
| D | 1.3103019e−017 | −5.7898546e−015 |

As shown in FIG. 1C, the second lens group 22 includes a plano-concave lens 221, a biconvex lens 223 and a concave-convex lens 225. The plano-concave lens 221 has a planar surface 221a and a concave surface 221b. The biconvex lens 223 has two convex surfaces 223a and 223b, wherein the convex surface 223a faces the concave surface 221b. The concave-convex lens 225 has a convex surface 225a and a concave surface 225b, wherein the convex surface 225a faces the convex surface 223b.

Figure 1D:
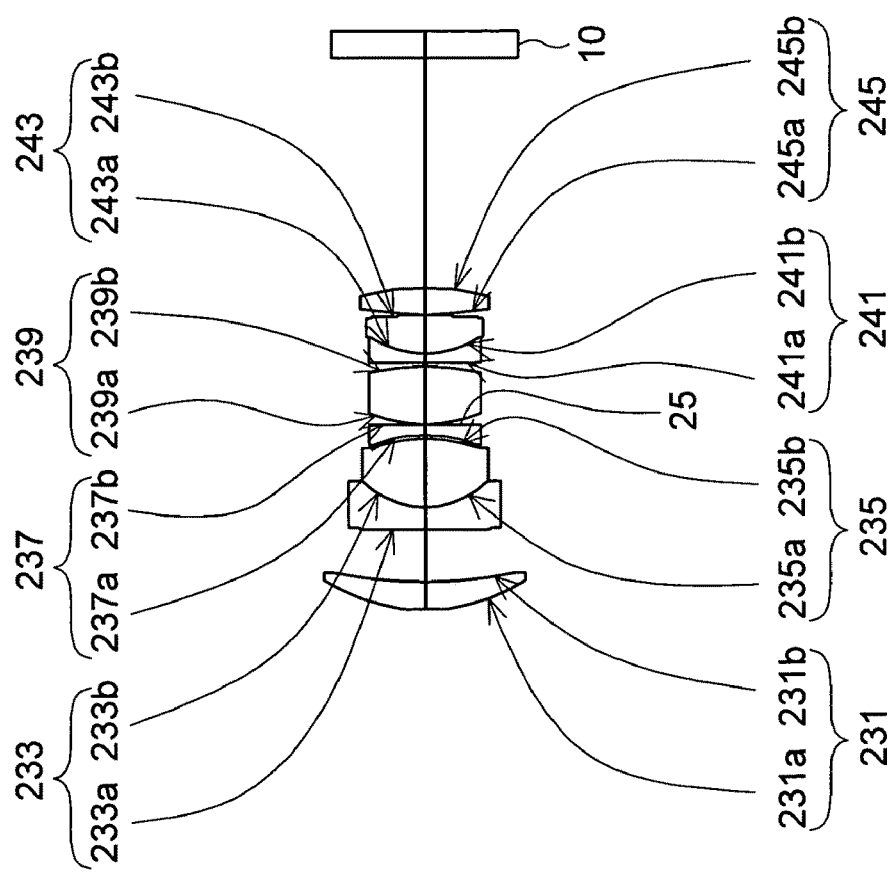
FIG. 1D shows the third lens group in FIG. 1A.

The third lens group 23 is shown in FIG. 1D. Preferably, between the second lens group 22 (shown in FIG. 1A) and the aperture stop 25, the third lens group 23 includes a concave-convex lens 231, a piano-concave lens 233, a biconvex lens 235 and a concave lens 237. The concave-convex lens 231 has a convex surface 231a and a concave surface 231b, wherein the convex surface 231a faces the second lens group 22. The plano-concave lens 233 has a planar surface 233a and a concave surface 233b, wherein the concave surface 233b is disposed backwards from the concave surface 231b. The biconvex lens 235 has two convex surfaces 235a and 235b, wherein the convex surface 235a leans against the concave surface 233b. The concave lens 237 has two concave surfaces 237a and 237b, wherein the concave surface 237a faces the convex surface 235b.

Between the aperture stop 25 and the optical element 10, the third lens group 23 includes a biconvex lens 239, a piano-concave lens 241 and another two biconvex lenses 243 and 245. The biconvex lens 239 has two convex surfaces 239a and 239b, wherein the convex surface 239a faces the concave surface 237b. The plano-concave lens 241 has a planar surface 241a and a concave surface 241b. The biconvex lens 243 has two convex surfaces 243a and 243b, wherein the convex surface 243a leans against the concave surface 241b. The biconvex lens 245 has two convex surfaces 245a and 245b, wherein the convex surface 245a faces the convex surface 243b.

The optical data and disposition of the first lens group 21, the second lens group 22 and the third lens group 23 in the present embodiment of the invention are illustrated in Table 2. However, the technology of the invention is not limited thereto.

TABLE 2

| Lens | lens | Curvature | Thickness | effective radius | EFL* (mm) |
|---|---|---|---|---|---|
| 211 | 211a | 65.72057 | 4 | ψ73.2 | EFL (21) |
|  | 211b | 27.92179 | 14 | ψ60.4 | −9.394 |
| 213 | 213a | 39.478 | 2.4 | ψ54.2 |  |
|  | 213b | 21.89 | 8.6 | ψ40.4 |  |
| 215 | 215a | 40.633 | 1.9 | ψ40 |  |
|  | 215b | 18.373 | 13.17 | ψ32 |  |
| 217 | 217a | −36.686 | 3 | ψ31.6 |  |
|  | 217b | — | 17.7 | ψ32.4 |  |
| 221 | 221a | — | 8 | ψ36.9 | EFL (22) |
|  | 221b | 75.632 | 2.38 | ψ38.26 | 44.044 |
| 223 | 223a | 84.157 | 11.9 | ψ40 |  |
|  | 223b | −48.164 | 5.08 | ψ41.2 |  |
| 225 | 225a | 45.964 | 8.7 | ψ39.4 |  |
|  | 225b | 500 | 15 | ψ37.3 |  |
| 231 | 231a | 23.795 | 3.1 | ψ23.6 | EFL (23) |
|  | 231b | 65.546 | 5.76 | ψ22.9 | 47.895 |
| 233 | 233a | — | 2.5 | — |  |
|  | 233b | 245.47 | 0 | ψ16.6 |  |
| 235 | 235a | 10.657 | 7.55 | ψ13.8 |  |
|  | 235b | −21.783 | 0.35 | ψ13 |  |
| 237 | 237a | −19.636 | 1 | ψ12.84 |  |
|  | 237b | 144.251 | 0.17 | ψ13 |  |
| aperture stop | — | — | 0.1 | ψ13 |  |
| 239 | 239a | 18.573 | 6.35 | ψ13 |  |
|  | 239b | −29.054 | 0.4 | ψ13 |  |
| 241 | 241a | — | 1 | ψ13 |  |
|  | 241b | 12.957 | 0 | ψ13 |  |
| 243 | 243a | 12.957 | 4.1 | ψ13 |  |
|  | 243b | −79.548 | 0.1 | ψ13.6 |  |
| 245 | 245a | 48.553 | 2.94 | ψ15 |  |
|  | 245b | −30.727 | 25 | ψ15 |  |

*Note: 'interval' refers to the air space between a lens surface and its neighboring lens. 'EFL' refers to effective focal length.

The distance between the concave-convex lens 211 of the first lens group 21 and the image side is approximately 1300 millimeters (mm). The effective focal length EFL(21) of the first lens group 21 is −9.394 mm. The effective focal length EFL(22) of the second lens group 22 is 44.044 mm. The effective focal length EFL(23) of the third lens group 23 is 47.895 mm. The results of the wide-angle projection lens 20 in the present embodiment of the invention according to Table 2 are disclosed below.

Figure 2:
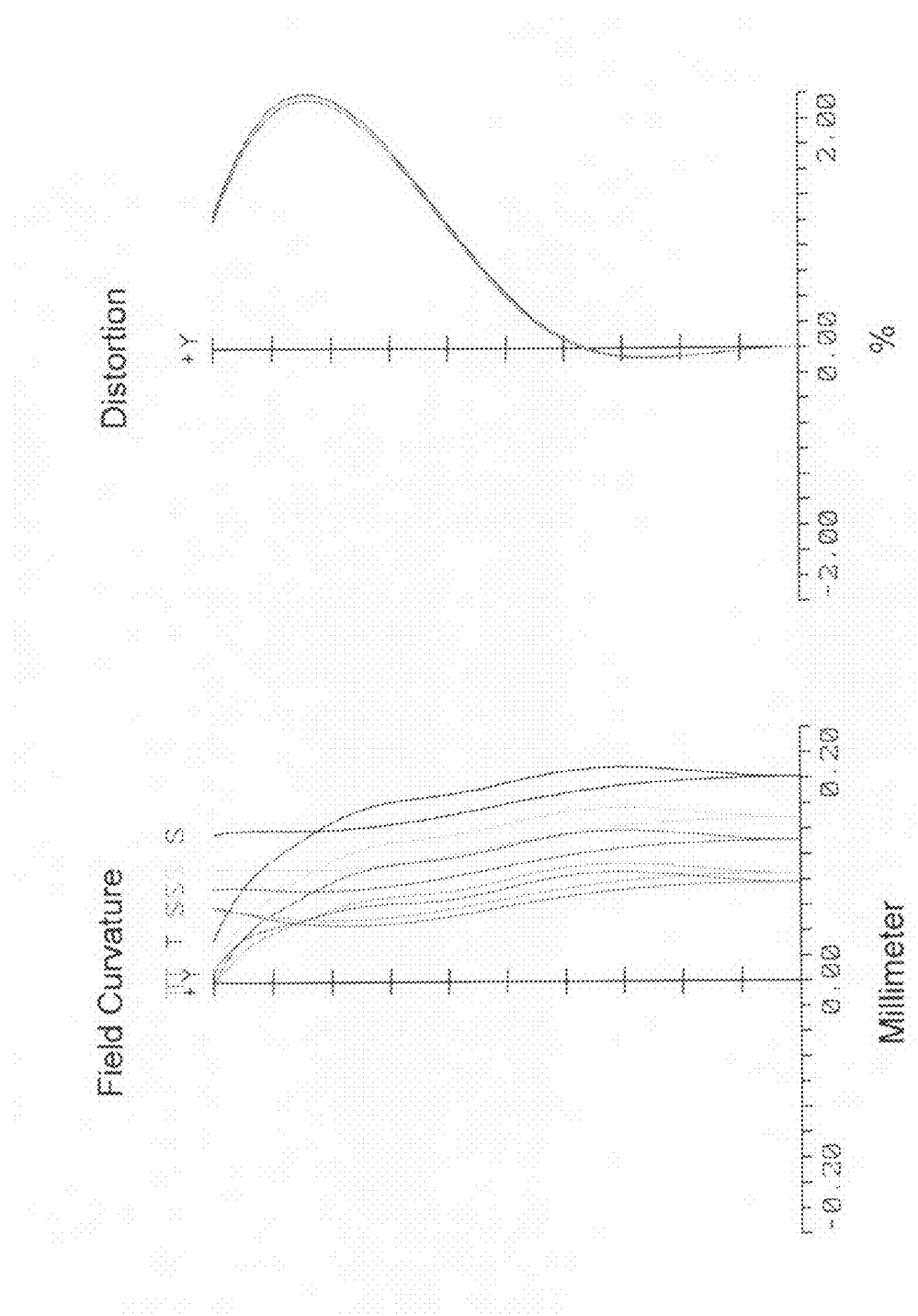
FIG. 2 shows the field curvature and distortion curve resulted from the wide-angle projection lens according to Table 2.
Figure 3A:
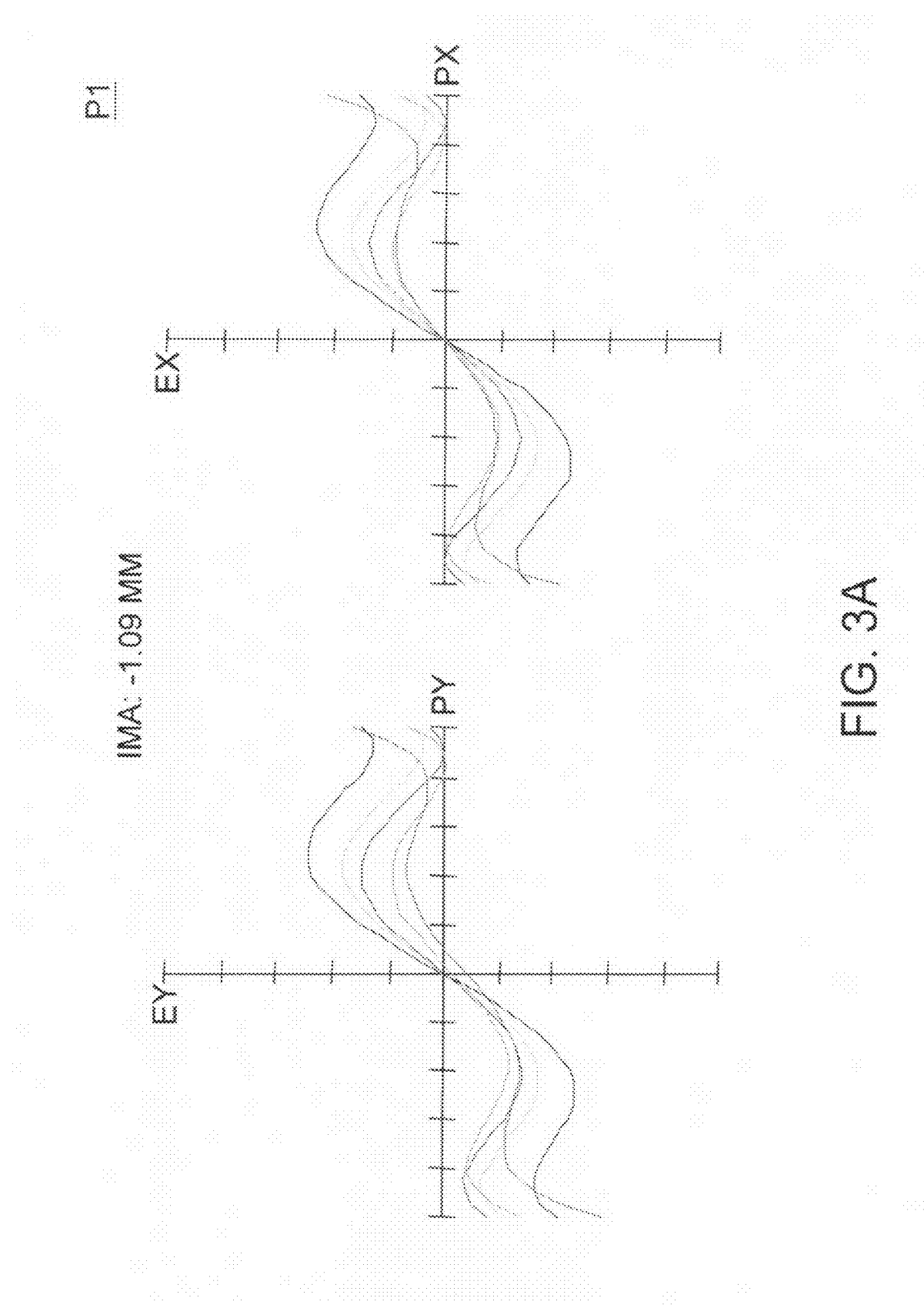
FIGS. 3A to 3H show the light aberration resulted from the wide-angle projection lens according to Table 2.
Figure 3B:
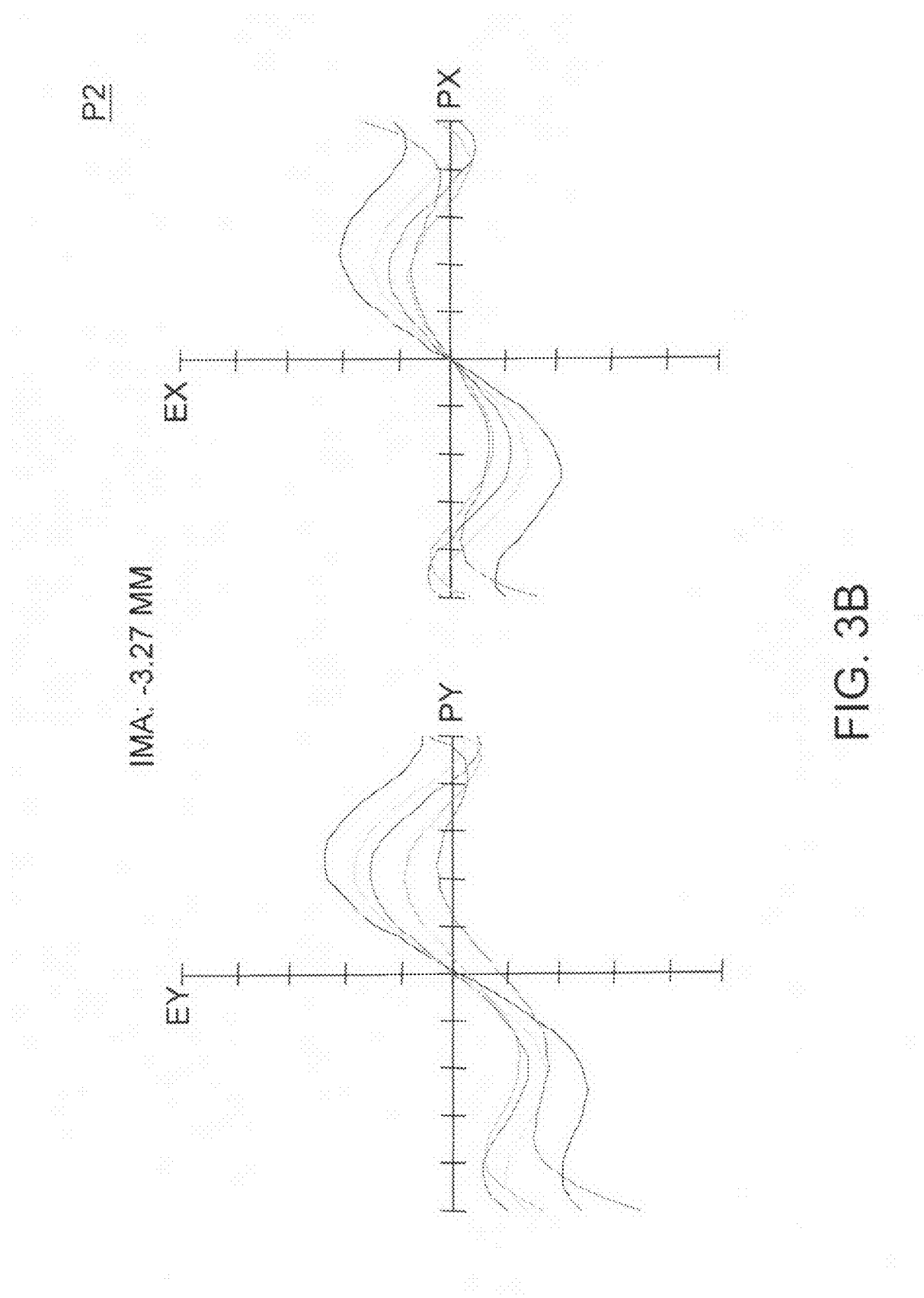
Figure 3C:
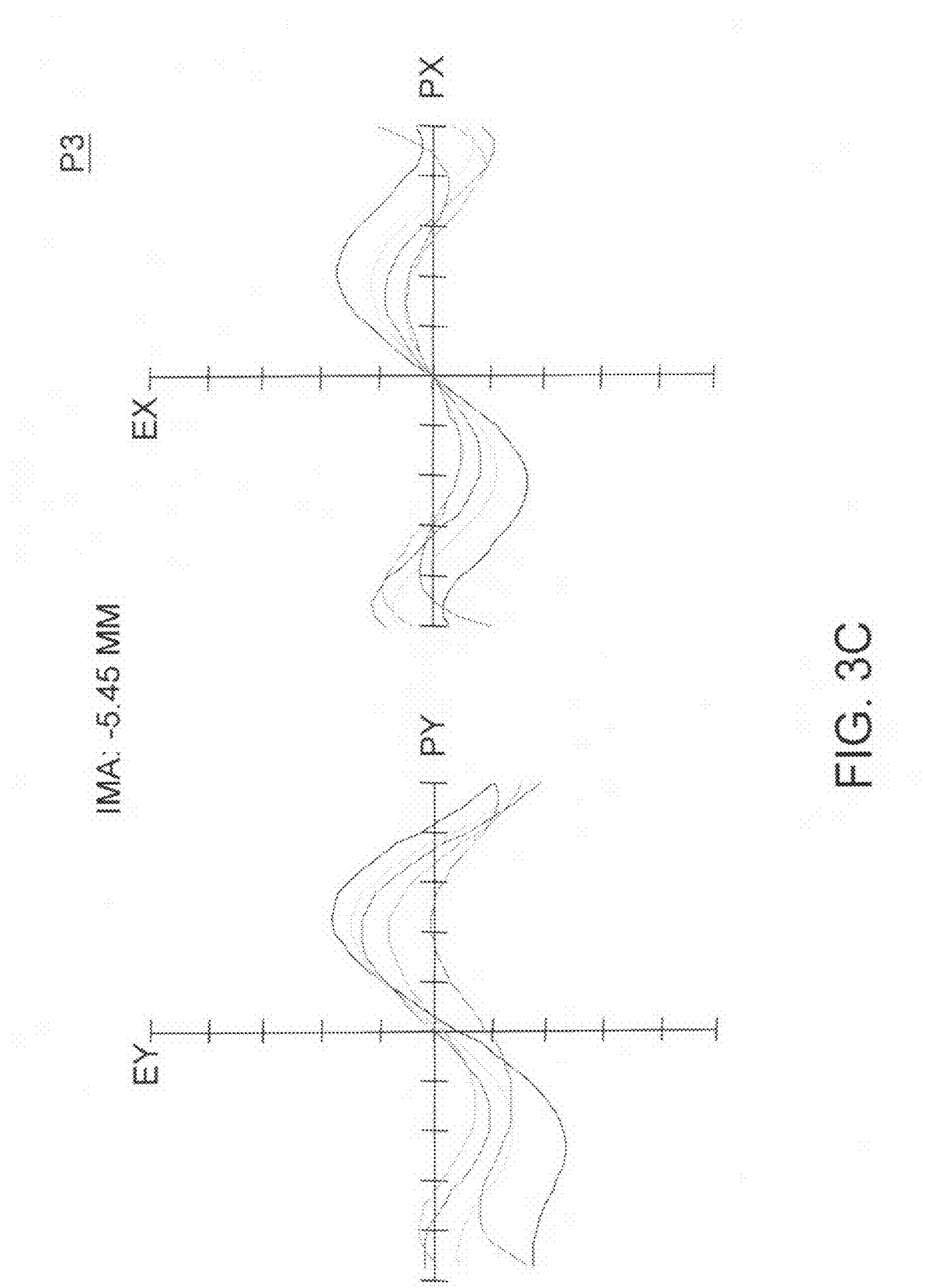
Figure 3D:
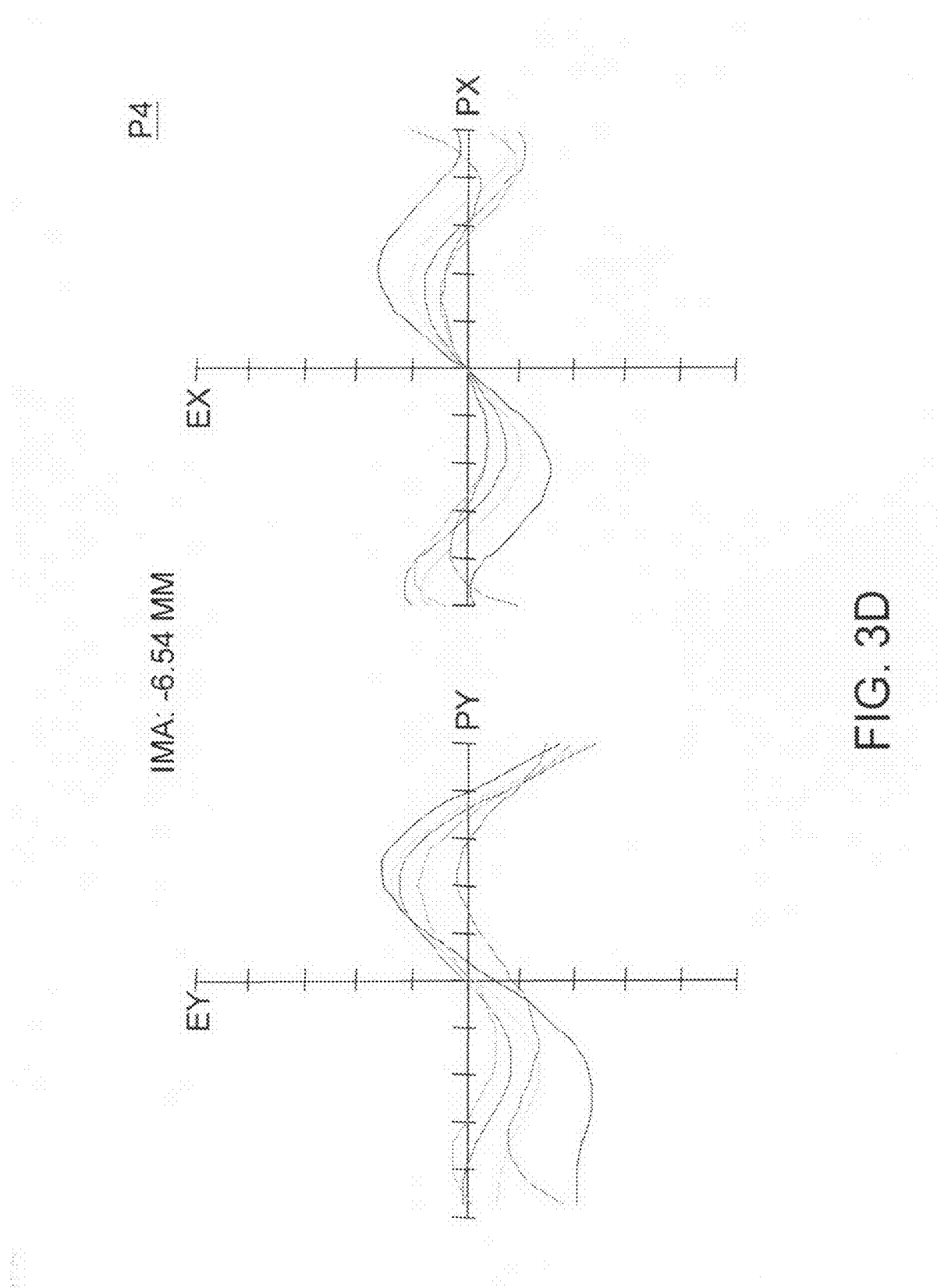
Figure 3E:
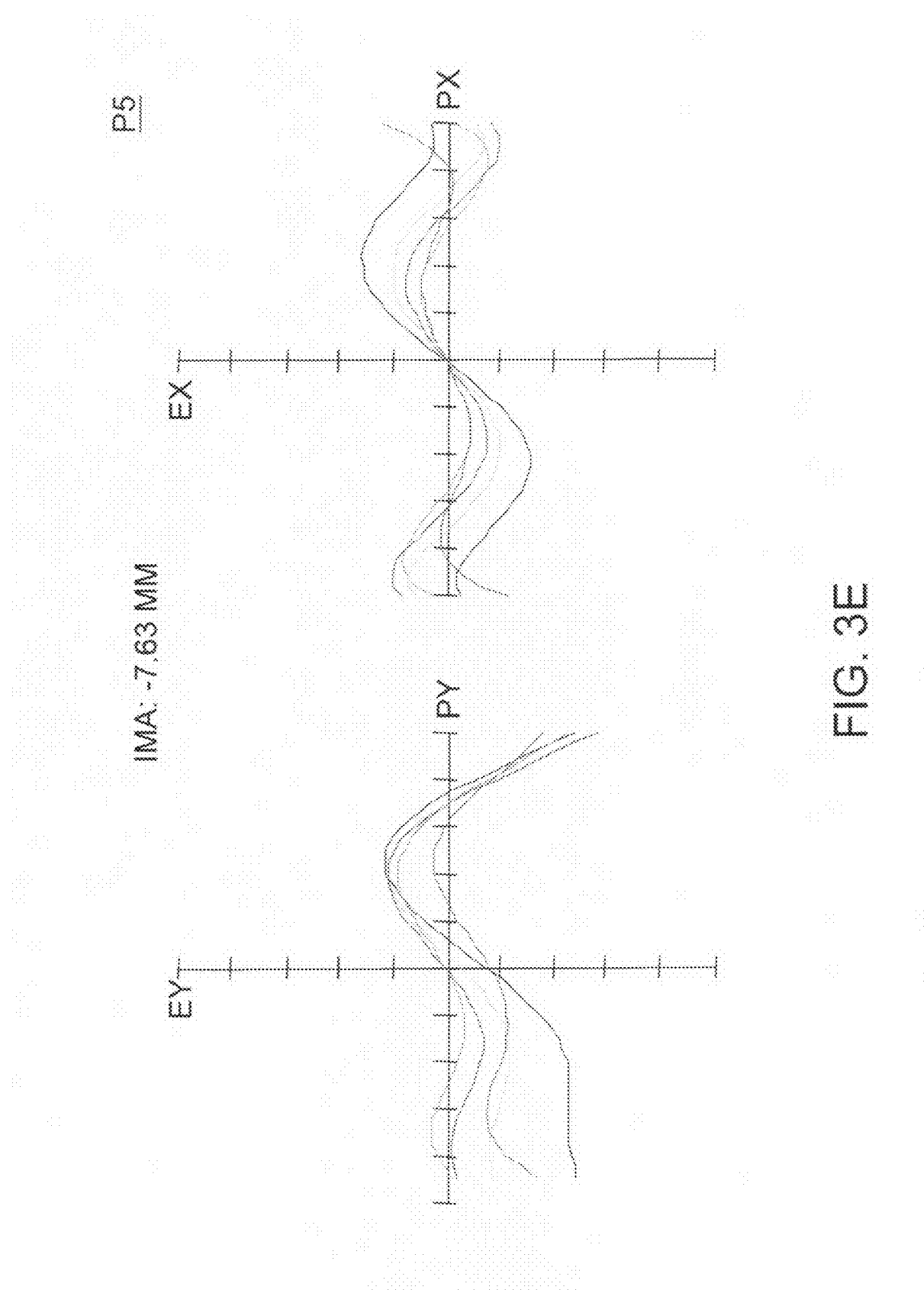
Figure 3F:
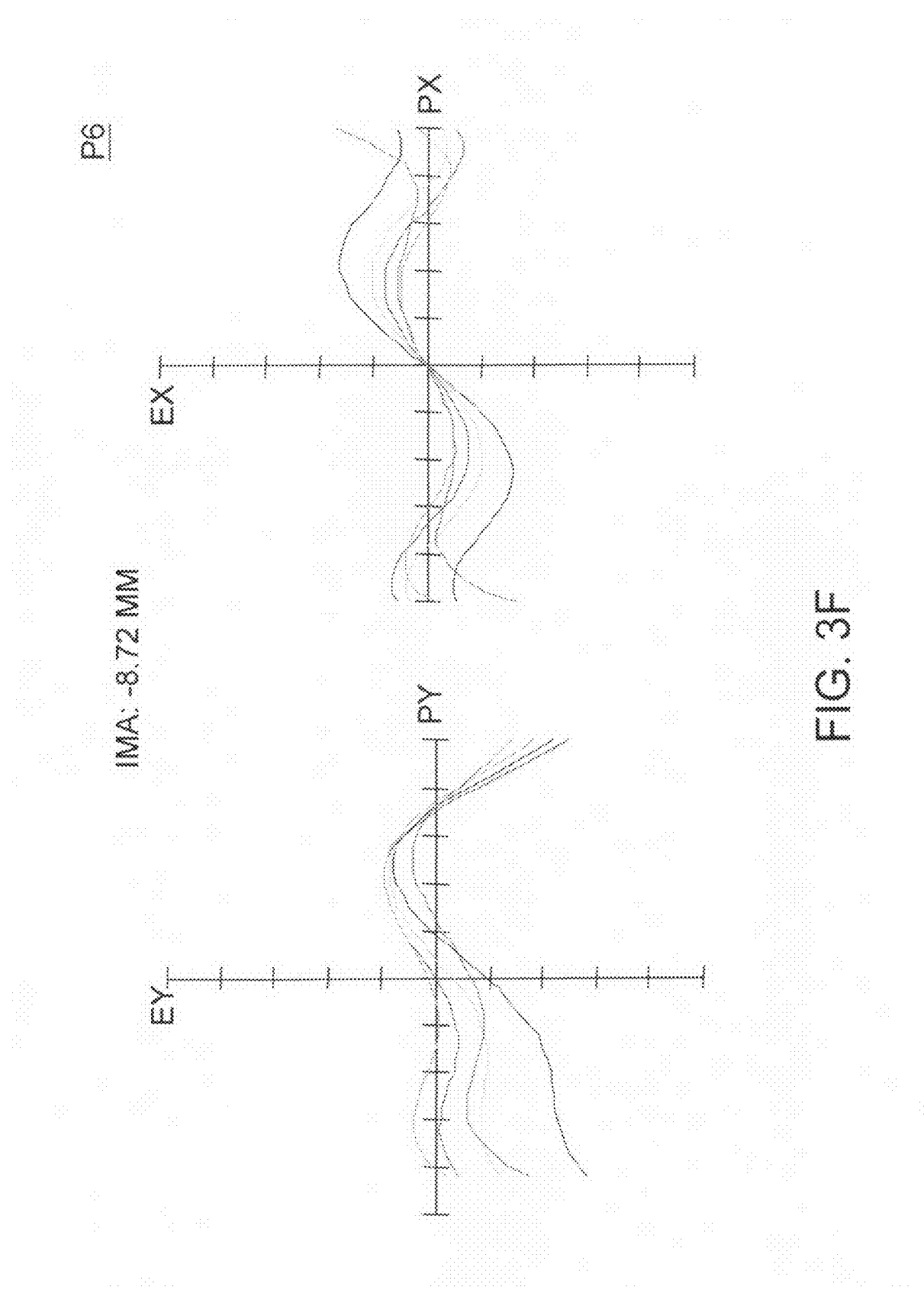
Figure 3G:
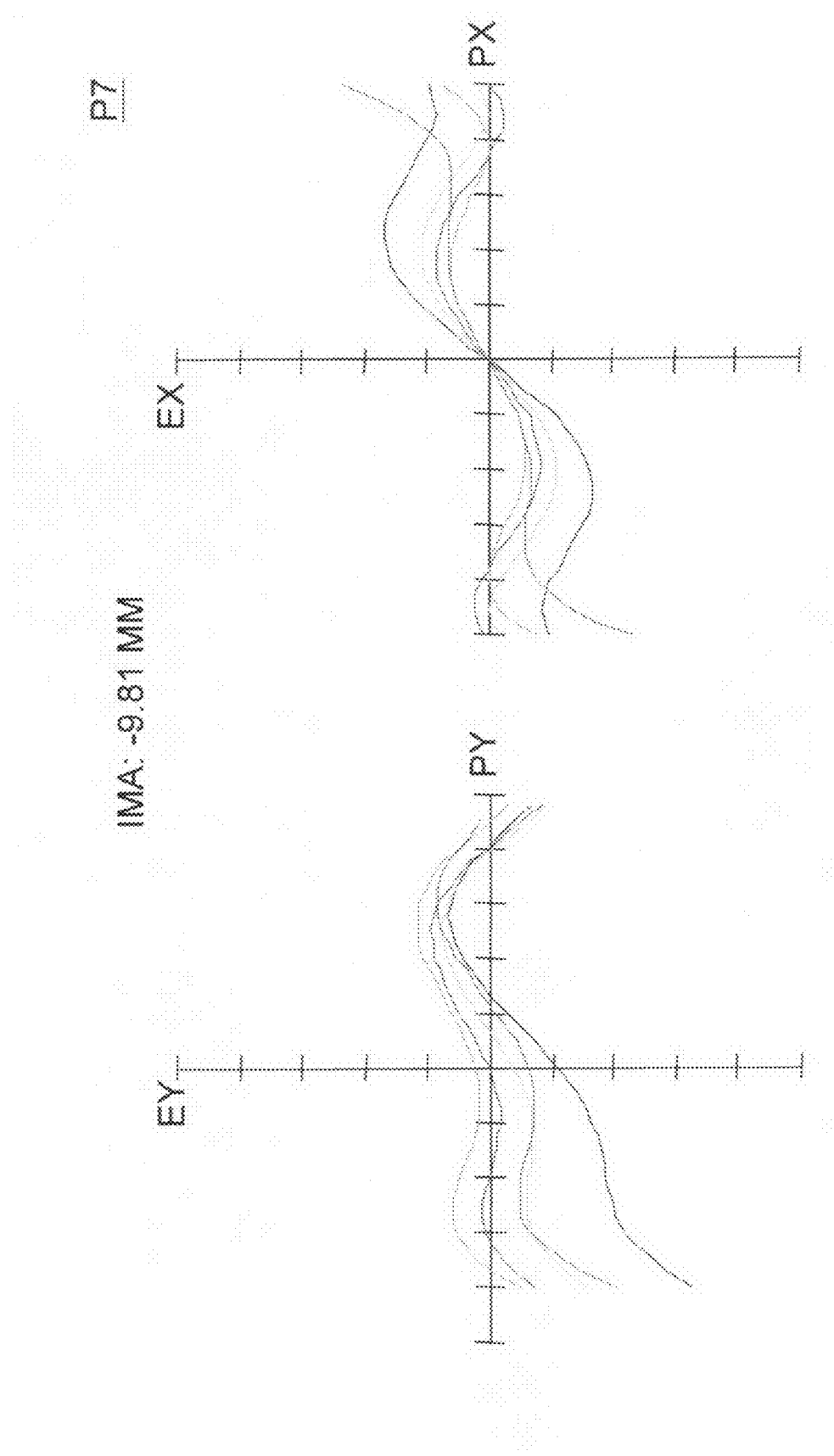
Figure 3H:
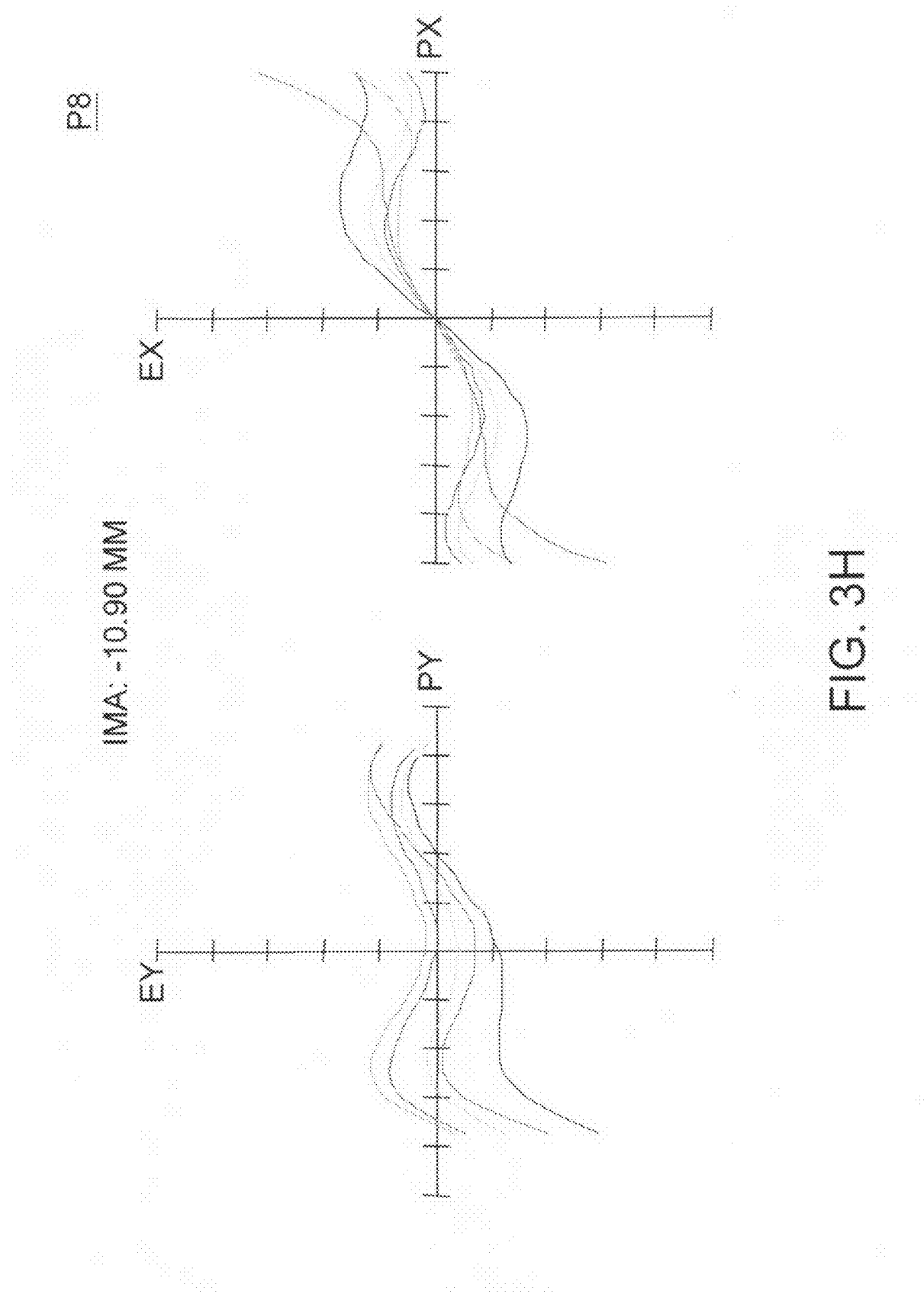

Referring to FIG. 2, a diagram of the field curvature and distortion curve resulted from the wide-angle projection lens according to Table 2 is shown. According to the testing result of FIG. 2, when the lights of different wavelengths are projected by the wide-angle projection lens, the field curvature of the lights of different wavelengths conforms to a standard range (approximately 0.2 mm), and the distortion also conforms to a standard range (approximately 2%).

Referring to the exhibits 1A to 1H, diagrams of the image point shift resulted from the test performed by the wide-angle projection lens according to Table 2 are shown. Normally, each the image point onto the image side needs to be within the standard range of a block whose length and width are both equal to 10.8 nanometers (nm). As shown in the exhibits 1A to 1H, the eight image points P1 to P8 (an image point is formed by the curve of the lights of different wavelengths) are approximately within the block whose length and width are equal to 10.8 nm. That is, the size of the image point projected by the wide-angle projection lens 20 in the present embodiment of the invention conforms to the standard.

Referring to FIGS. 3A to 3H, diagrams of the light aberration resulted from the test performed by the wide-angle projection lens according to Table 2 are shown. Eight image points the same as the above image points P1~P8 are measured. As shown in FIGS. 3A to 3H, the values of light aberration of each of the eight image points P1~P8 are within the standard range.

Figure 4:
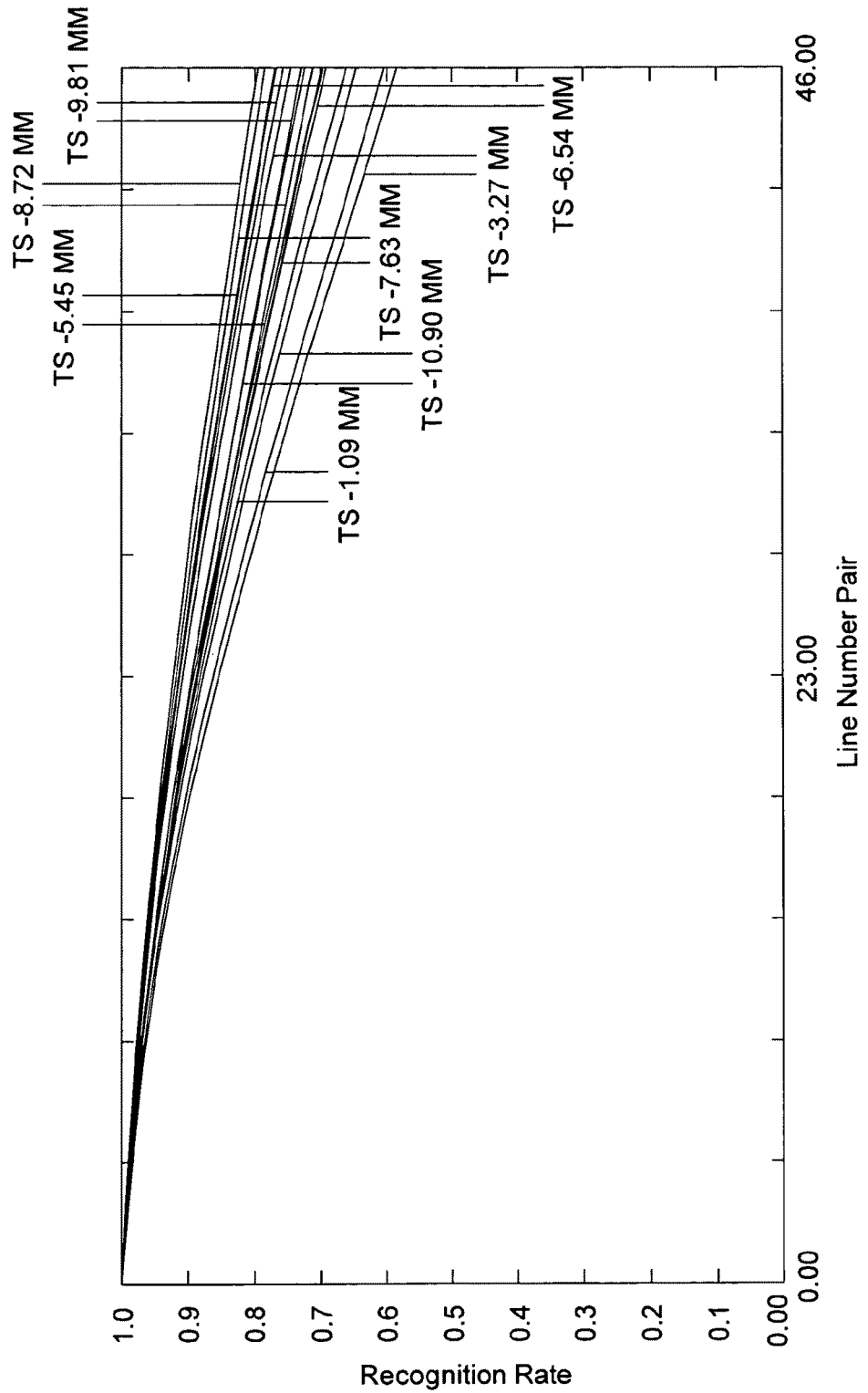
FIG. 4 shows the relationship between recognition rate and line-pairs resulted from the wide-angle projection lens according to Table 2.

Referring to FIG. 4, diagram of the relationship between recognition rate and line-pairs resulted from the test performed by the wide-angle projection lens according to Table 2 is shown. The curves in FIG. 4 are the testing results of the lights of different wavelengths. According to the testing results shown in FIG. 4, the recognition rate of each line-pairs confirms to the standard (normally, approximates to 40%). As indicated in the above testing results, when an image is projected by the wide-angle projection lens 20, the field curvature, distortion, shift and light aberration are all within a standard range, so the image points are faithfully presented.

The distance between the wide-angle projection lens 20 of the present embodiment of the invention and the image side (projection screen) can be set as 1 meter such that the height of the image (the projected object) projected on the image side is approximately 70 inches. The range of the effective focal length fw of the wide-angle projection lens 20 is expressed as: 6.5 mm<fw<9.5 mm. The wide-angle projection lens 20 in the present embodiment of the invention has a short focal length, and is non-telecentric.

According to the wide-angle projection lens and the projection apparatus using the same disclosed in the above embodiments of the invention, the three lens groups of the wide-angle projection lens have a negative, a positive, and a positive effective refractive power, respectively, and the aperture stop is disposed in the lens group nearest to the optical element. The lens group having a negative effective refractive power includes at least one aspheric lens surface. Thus, the wide-angle projection lens and the projection apparatus using the same maintain most of the image information so that the image is faithfully presented.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle projection lens used in a projection apparatus, wherein from an image side of the projection apparatus, the wide-angle projection lens comprises:
   a first lens group having an imaging optical axis, a negative effective refractive power and at least one aspheric lens surface;
   a second lens group having a first positive effective refractive power;
   a third lens group having a second positive effective refractive power; and
   an aperture stop disposed in the third lens group;
   wherein an effective focal length of the combination of the first lens group, the second lens group and the third lens group is fw, 6.5 mm<fw<9.5 mm, a light projected from a light-source side of the projection apparatus to the wide-angle projection lens generates an image to the image side of the projection apparatus, and a center of the light and a center of the image are located at different sides of the imaging optical axis.

2. The wide-angle projection lens according to claim 1, wherein the height of an image on the image side is h, 1.2<|h/fw|<1.6.

3. The wide-angle projection lens according to claim 1, wherein the first lens group comprises at least one aspheric lens.

4. The wide-angle projection lens according to claim 1, wherein the first lens group comprises:
   a first convexo-concave lens having a first convex surface and a first concave surface;
   a second convexo-concave lens having a second convex surface and a second concave surface, wherein the second convex surface faces the first concave surface;
   a third convexo-concave lens having a third convex surface and a third concave surface, wherein the third convex surface faces the second concave surface; and
   a piano-concave lens having a fourth concave surface that faces the third concave surface.

5. The wide-angle projection lens according to claim 1, wherein the second lens group comprises:
   a plano-concave lens having a first concave surface, wherein the first concave surface is disposed backwards from the first lens group;
   a biconvex lens having a first convex surface and a second convex surface, wherein the first convex surface faces the first concave surface; and
   a concave-convex lens having a second concave surface and a third convex surface that faces the second convex surface.

6. The wide-angle projection lens according to claim 1, wherein the projection apparatus further comprises an optical element, and between the second lens group and the optical element, the third lens group comprises:
   a concave-convex lens having a first convex surface and a first concave surface, wherein the first convex surface faces the second lens group;
   a first piano-concave lens having a second concave surface disposed backwards from the first concave surface;
   a first biconvex lens having a second and a third convex surfaces, wherein the second convex surface leans against the second concave surface;
   a concave lens having a third concave surface and a fourth concave surface, wherein the third concave surface faces the third convex surface;
   a second biconvex lens having a fourth convex surface and a fifth convex surface, wherein the fourth convex surface faces the fourth concave surface;
   a second plano-concave lens having a fifth concave surface;
   a third biconvex lens having a sixth and a seventh convex surfaces, wherein the sixth convex surface leans against the fifth concave surface; and
   a fourth biconvex lens having an eighth and a ninth convex surfaces, wherein the eighth convex surface faces the seventh convex surface.

7. A projection apparatus, comprising:
   an optical element; and
   a wide-angle projection lens, comprising:
      a first lens group having a negative effective refractive power and at least one aspheric lens surface;
      a second lens group disposed between the optical element and the first lens group, wherein the second lens group has a first positive effective refractive power;
      a third lens group disposed between the optical element and the second lens group, wherein the third lens group has a second positive effective refractive power; and an aperture stop disposed in the third lens group;
wherein an effective focal length of the combination of the first, second and third lens groups is fw, 6.5 min<fw<9.5 mm, and the height of an image projected on an image side by the wide-angle projection lens is h, 1.2<|h/fw|<1.6.

8. The projection apparatus according to claim 7, wherein the structure of the wide-angle projection lens is non-telecentric.

9. The projection apparatus according to claim 7, wherein the first lenses comprises:
   a first convexo-concave lens having a first convex surface and a first concave surface, wherein the first convex surface backs to the optical element;
   a second convexo-concave lens having a second convex surface and a second concave surface, wherein the second convex surface faces the first concave surface;
   a third convexo-concave lens having a third convex surface and a third concave surface, wherein the third convex surface faces the second concave surface; and
   a piano-concave lens having a fourth concave, wherein the fourth concave surface faces the third concave surface.

10. The projection apparatus according to claim 7, wherein the second lens group comprises:
    a plane-concave lens having a first concave surface, wherein the first concave surface is disposed backwards from the first lens group;
    a biconvex lens having a first convex surface and a second convex surface, wherein the first convex surface faces the first concave surface; and
    a concave-convex lens having a second concave surface and a third convex surface that faces the second convex surface.

11. The projection apparatus according to claim 7, wherein between the second lens group and the optical element, the third lens group comprises:
    a concave-convex lens having a first convex surface and a first concave surface, wherein the first convex surface faces the second lens group;
    a first piano-concave lens having a second concave surface disposed backwards from the first concave surface;
    a first biconvex lens having a second and a third convex surfaces, wherein the second convex surface leans against the second concave surface;
    a concave lens having a third concave surface and a fourth concave surface, wherein the third concave surface faces the third convex surface;
    a second biconvex lens having a fourth convex surface and a fifth convex surface, wherein the fourth convex surface faces the fourth concave surface;
    a second plano-concave lens having a fifth concave surface;
    a third biconvex lens having a sixth and a seventh convex surfaces, wherein the sixth convex surface leans against the fifth concave surface; and
    a fourth biconvex lens having an eighth and a ninth convex surfaces, wherein the eighth convex surface faces the seventh convex surface.

12. A projection apparatus, comprising:
    an optical element; and
    a wide-angle projection lens, comprising:
      a first lens group having an imaging optical axis, a negative effective refractive power and at least one aspheric lens surface;
      a second lens group disposed between the optical element and the first lens group, wherein the second lens group has a first positive effective refractive power;
      a third lens group disposed between the optical element and the second lens group, wherein the third lens group has a second positive effective refractive power; and
      an aperture stop disposed in the third lens group;
      wherein an effective focal length of the combination of the first, second and third lens groups is fw, 6.5 mm<fw<9.5 mm, a light projected from the optical element to the wide-angle projection lens generates an image to an image side of the projection apparatus, and a center of the light and a center of the image are located at different sides of the imaging optical axis.

13. The projection apparatus according to claim 12, wherein the height of an image on the image side is h, 1.2<|h/fw|<1.6.

14. The projection apparatus according to claim 12, wherein the first lens group comprises at least one aspheric lens.

15. The projection apparatus according to claim 12, wherein the first lens group comprises:
    a first convexo-concave lens having a first convex surface and a first concave surface;
    a second convexo-concave lens having a second convex surface and a second concave surface, wherein the second convex surface faces the first concave surface;
    a third convexo-concave lens having a third convex surface and a third concave surface, wherein the third convex surface faces the second concave surface; and
    a piano-concave lens having a fourth concave surface that faces the third concave surface.

16. The projection apparatus according to claim 12, wherein the second lens group comprises:
    a plano-concave lens having a first concave surface, wherein the first concave surface is disposed backwards from the first lens group;
    a biconvex lens having a first convex surface and a second convex surface, wherein the first convex surface faces the first concave surface; and
    a concave-convex lens having a second concave surface and a third convex surface that faces the second convex surface.

17. The projection apparatus according to claim 12, wherein between the second lens group and the optical element, the third lens group comprises:
    a concave-convex lens having a first convex surface and a first concave surface, wherein the first convex surface faces the second lens group;
    a first plano-concave lens having a second concave surface disposed backwards from the first concave surface;
    a first biconvex lens having a second and a third convex surfaces, wherein the second convex surface leans against the second concave surface;
    a concave lens having a third concave surface and a fourth concave surface, wherein the third concave surface faces the third convex surface;
    a second biconvex lens having a fourth convex surface and a fifth convex surface, wherein the fourth convex surface faces the fourth concave surface;
    a second plano-concave lens having a fifth concave surface;
    a third biconvex lens having a sixth and a seventh convex surfaces, wherein the sixth convex surface leans against the fifth concave surface; and
    a fourth biconvex lens having an eighth and a ninth convex surfaces, wherein the eighth convex surface faces the seventh convex surface.

18. The wide-angle projection lens according to claim 1, wherein the structure of the wide-angle projection lens is non-telecentric.

19. The wide-angle projection lens according to claim 1, wherein the wide-angle projection lens is a first spectrum image-wide-angle projection lens.

20. The projection apparatus according to claim 12, wherein the structure of the wide-angle projection lens is non-telecentric.

21. The projection apparatus according to claim 12, wherein the wide-angle projection lens is a first spectrum image-wide-angle projection lens.

22. A wide-angle projection lens used in a projection apparatus, wherein from an image side of the projection apparatus, the wide-angle projection lens comprises:
 a first lens group having a negative effective refractive power and at least one aspheric lens surface;
 a second lens group having a first positive effective refractive power;
 a third lens group having a second positive effective refractive power; and
 an aperture stop disposed in the third lens group;
wherein the structure of the wide-angle projection lens is non-telecentric, an effective focal length of the combination of the first lens group, the second lens group and the third lens group is fw, 6.5 mm<fw<9.5 mm, and the height of an image on the image side is h, $1.2<|h/fw|<1.6$.

23. The wide-angle projection lens according to claim 22, wherein the first lens group having an imaging optical axis, a light projected from a light-source side of the projection apparatus to the wide-angle projection lens generates an image to the image side of the projection apparatus, a center of the light and a center of the image are located at different sides of the imaging optical axis, and the wide-angle projection lens is a first spectrum image-wide-angle projection lens.

* * * * *